(12) United States Patent
Hwang et al.

(10) Patent No.: US 8,688,075 B2
(45) Date of Patent: Apr. 1, 2014

(54) HANDLING INSUFFICIENT ACCOUNT BALANCE OF SUBSCRIBERS

(75) Inventors: Kuen-Yih Hwang, Naperville, IL (US); John Lawrence Snapp, Westminster, CO (US)

(73) Assignee: West Corporation, Omaha, NE (US)

( * ) Notice: Subject to any disclaimer, the term of this patent is extended or adjusted under 35 U.S.C. 154(b) by 1258 days.

(21) Appl. No.: 11/857,515

(22) Filed: Sep. 19, 2007

(65) Prior Publication Data

US 2009/0075627 A1    Mar. 19, 2009

(51) Int. Cl.
*H04M 11/00* (2006.01)
*H04M 1/725* (2006.01)
*H04M 11/10* (2006.01)

(52) U.S. Cl.
USPC .................. 455/408; 455/412.2; 455/413

(58) Field of Classification Search
USPC .............. 455/406, 407, 408, 405, 409, 414.1, 455/414.2, 413
See application file for complete search history.

(56) References Cited

U.S. PATENT DOCUMENTS

| | | | |
|---|---|---|---|
| 5,991,748 A | 11/1999 | Taskett | |
| 6,101,378 A * | 8/2000 | Barabash et al. | 455/406 |
| 6,333,973 B1 * | 12/2001 | Smith et al. | 379/88.12 |
| 6,345,766 B1 * | 2/2002 | Taskett et al. | 235/493 |
| 6,373,930 B1 | 4/2002 | McConnell et al. | |
| 6,577,717 B1 * | 6/2003 | Henon | 455/406 |
| 6,704,563 B1 | 3/2004 | Senn et al. | |
| 6,975,852 B1 * | 12/2005 | Sofer et al. | 455/408 |
| 2001/0040949 A1 | 11/2001 | Blonder et al. | |
| 2002/0076018 A1 | 6/2002 | Banks et al. | |
| 2002/0077076 A1 | 6/2002 | Suryanarayana et al. | |
| 2002/0101966 A1 | 8/2002 | Nelson | |
| 2002/0131571 A1 | 9/2002 | Walker et al. | |
| 2003/0033198 A1 | 2/2003 | Flannery et al. | |
| 2003/0072319 A1 * | 4/2003 | Pedersen | 370/431 |
| 2003/0091170 A1 | 5/2003 | McCann et al. | |
| 2003/0158812 A1 | 8/2003 | Engelhart | |
| 2003/0216147 A1 * | 11/2003 | Morin et al. | 455/466 |
| 2004/0009760 A1 | 1/2004 | Laybourn et al. | |
| 2004/0023636 A1 | 2/2004 | Gurel | |
| 2004/0078327 A1 | 4/2004 | Frazier et al. | |
| 2004/0114739 A1 | 6/2004 | Hausmann | |
| 2004/0116136 A1 | 6/2004 | Voehringer | |
| 2004/0131166 A1 | 7/2004 | Griffiths | |
| 2004/0137874 A1 * | 7/2004 | Veerepalli et al. | 455/405 |
| 2004/0151292 A1 | 8/2004 | Larsen | |
| 2004/0171368 A1 | 9/2004 | Senn et al. | |
| 2004/0185827 A1 | 9/2004 | Parks | |
| 2004/0192359 A1 | 9/2004 | McRaild et al. | |
| 2004/0193513 A1 | 9/2004 | Pruss et al. | |
| 2004/0198316 A1 | 10/2004 | Johnson | |

(Continued)

FOREIGN PATENT DOCUMENTS

EP    1030506 A2    8/2000
WO    WO9825237 A1    6/1998

*Primary Examiner* — Christopher M Brandt (57) ABSTRACT

A system, method, and computer readable medium comprising instructions for handling insufficient account balance of subscribers in a mobile communications network is disclosed. A request for communication is received from a mobile station. A determination is made as to whether a subscriber of the mobile station has an insufficient account balance. If the subscriber has an insufficient account balance, the request is withheld and the mobile station is notified by a short message.

20 Claims, 6 Drawing Sheets

(56) References Cited

U.S. PATENT DOCUMENTS

| | | |
|---|---|---|
| 2004/0203585 A1 | 10/2004 | Wills et al. |
| 2004/0258229 A1 | 12/2004 | Mayron |
| 2005/0091075 A1 | 4/2005 | Cohen et al. |
| 2005/0107066 A1 | 5/2005 | Erskine et al. |
| 2005/0182711 A1 | 8/2005 | Pulkkinen et al. |

* cited by examiner

HANDLING INSUFFICIENT ACCOUNT BALANCE OF SUBSCRIBERS

FIELD OF THE INVENTION

The present disclosure is generally related to a mobile communications network, and more particularly to handling insufficient account balance of subscribers in a mobile communications network.

BACKGROUND OF THE INVENTION

In current mobile communications networks, services may be purchased in advance by subscribers from their service providers. These subscribers are known as prepaid subscribers. Prepaid services include not only voice communication services, but also text-based communication services such as email or short message service (SMS). SMS allows subscribers to send short messages across the network to other subscribers in a timely fashion. Typically, short messages originating from mobile subscribers are handled by mobile service switching centers (MSCs) in the network and prepayment information is handled by a prepaid server (PPS).

While prepaid services provide convenience to subscribers, current mobile communications networks fail to handle insufficient account balance of prepaid subscribers efficiently. An insufficient account balance occurs when the account balance of a prepaid subscriber falls below a predetermined threshold. Current systems handle an insufficient account balance by sending a notification to the subscriber via a band signal. However, the notification is sent only when an active voice call or short messaging is in progress and only to the calling subscriber.

Another problem associated with insufficient account balance of prepaid subscribers is missed calls. Typically, prepaid subscribers receive missed call notifications from the system via short messages. However, if the cause of missed calls is due to insufficient account balance, current systems fail to identify this problem and notify the subscribers with funding instructions. Similarly, short messages may be missed, held, or undelivered due to insufficient account balance of prepaid subscribers. Current systems fail to notify the subscribers with instructions on how to recover these messages. Therefore, what is needed is an ability to overcome the problems and limitations of handling insufficient account balance of prepaid subscribers.

SUMMARY OF THE INVENTION

The present disclosure provides an improved method, system, and computer readable medium comprising instructions for handling insufficient account balance of prepaid or non-prepaid subscribers in a mobile communications network.

The present disclosure describes a method for handling insufficient account balance of subscribers. In one embodiment of the present disclosure, a request for communication is received from a mobile station. A determination is made if a subscriber of the mobile station has an insufficient account balance. If the subscriber has an insufficient account balance, the request is withheld and the mobile station is notified by a short message. In addition, a determination is made if a subscriber of a destination mobile station has an insufficient account balance. If the subscriber has an insufficient account balance, the voice call is disconnected and the destination mobile station is notified by a short message. However, if the subscriber has a sufficient account balance, a missed call notification short message is sent to the destination mobile station.

In another embodiment of the present disclosure, a voice call is received from a mobile station. A determination is made if a subscriber of the mobile station has an insufficient account balance. If the subscriber has an insufficient account balance, the voice call is withheld and the mobile station is notified by a short message. The short message may be sent periodically to the mobile station until the account balance is above a predetermined threshold amount. In addition, a determination is made if a subscriber of a destination mobile station has an insufficient account balance. If the subscriber has an insufficient account balance, the voice call is rerouted to a voice mail system and the destination mobile station is notified by a short message. However, if the subscriber has a sufficient account balance, a voice mail notification short message is sent to the destination mobile station.

In a further embodiment of the present disclosure, requests for voice calls between a mobile station and a prepaid server are monitored. Responsive to receiving a request for a voice call from the mobile station, a determination is made if a subscriber of the mobile station has an insufficient account balance. If the subscriber has an insufficient account balance, the voice call is disconnected and the mobile station is notifying by a short message. Responsive to receiving a request for a voice call from the mobile station, a determination is made if a subscriber of a destination mobile station has an insufficient account balance. If the subscriber has an insufficient account balance, the voice call is disconnected and the destination mobile station is notified by a short message.

In yet a further embodiment of the present disclosure, a system for handling insufficient account balance of subscribers is disclosed. The system comprises at least one mobile station, at least one mobile switching center communicably connected to the at least one mobile station, at least one mobile switching center communicably connected to at least one short message service center, and a prepaid server communicably connected to the at least one short message service center, the at least one short message service center is operable to receive a request for communication from the at least one mobile station, determine if a subscriber of the at least one mobile station has an insufficient account balance, and withhold the request and notify the at least one mobile station if the subscriber has an insufficient account balance.

DETAILED DESCRIPTION OF THE INVENTION

Figure 1:
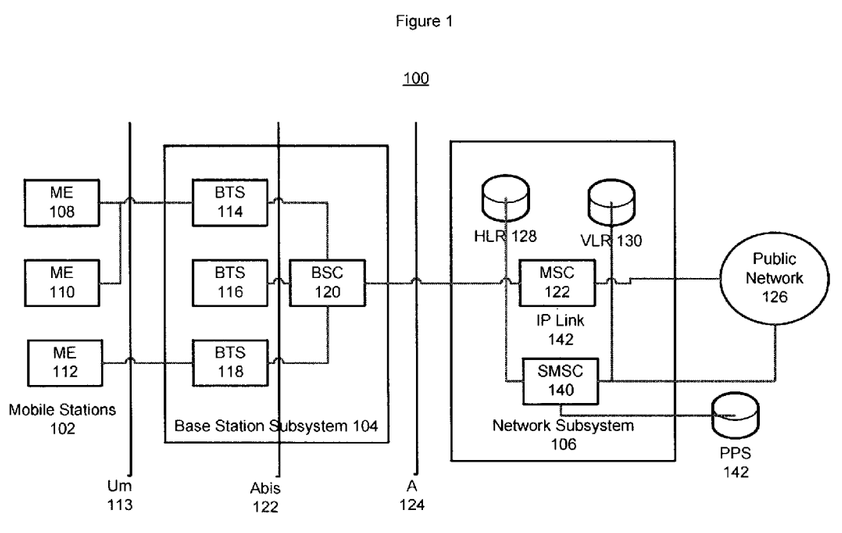
FIG. 1 depicts a system for handling insufficient account balance of prepaid subscribers in accordance with an embodiment of the present disclosure.

Referring now to FIG. 1, a system for handling insufficient account balance of prepaid subscribers is depicted. The mobile communications network 100 comprises three functional entities: mobile stations 102, a base station subsystem 104, and a network subsystem 106. The mobile stations entity 102 includes one or more mobile stations with mobile equipment (ME), such as MES 108, 110, 112, carried by subscribers. Examples of mobile stations include cellular telephones, portable computers, and personal digital assistants. In some embodiments, subscribers may place voice calls, transmit/receive data, and/or send short messages from their respective mobile station.

The base station subsystem 104 controls the radio link with the mobile stations 102. The base station subsystem 104 comprises base transceiver stations (BTSs) and base station controllers (BSC). BTS houses radio transceivers (TRX) that define a cell and handles radio link protocol with the mobile stations 102. Each BTS may handle radio links for one or more mobile equipment devices across a Um interface 113. For example, BTS 114 handles radio links for ME 108 and 110, while BTS 118 handles radio links for ME 112. BTSs, such as BTS 114 and 118, communicate with BSC 120 across a standard, or vendor proprietary Abis interface 122, which allows communications between MEs, that are made by different vendors, and the BSC 120.

BSC 120 manages radio resources for one or more BTSs. BSC 120 handles radio-channel setup, frequency hopping, handovers, etc. BSC 120 provides communications between the mobile stations 102 and the mobile service switching center (MSC) 122 of the network subsystem 106. BSC 120 communicates with MSC 122 across an A interface 124.

MSC 122 in network subsystem 106 performs switching of calls or data between mobile users, and between mobile and fixed telephony network. MSC 122 acts as a node of a public network 126, such as PLMN, ISDN, or PSTN. MSC 122 provides all the functionality necessary to handle a mobile subscriber, including registration, authentication, location updating, handovers, and mobility management operations. Signalling between functional entities in the network subsystem 106 uses signaling system number 7 (SS7), which is widely used for trunk signaling in ISDN and other public networks.

Network subsystem 106 also comprises a home location register (HLR) and visitor location register (VLR) for enabling MSC's call routing and roaming capabilities. HLR 128 comprises information of each subscriber registered in the network 100 and the current location of the ME. VLR 130 comprises selected information from the HLR 128 for each ME currently located in the geographical area controlled by the VLR 130. In most implementations, VLR 130 is associated with a MSC 122 to store information of MEs that are in the geographical area controlled by the MSC 122.

When a short message or voice call is sent by a mobile station, such as ME 108, the MSC 122 communicates with short message service center (SMSC) 140 via an IP link 142 or other signals, such as SS7 and the like. SMSC 140 stores short messages originating from the mobile stations and forwards the messages to the appropriate destination. When forwarding messages, SMSC 140 communicates with public network 126 via an SS7 network link. The SMSC 140 may use the HLR 128 and VLR 130 to lookup a MSC serving the destination mobile station.

The SMSC 140 accesses a plurality of databases to process the short message, including prepaid server (PPS) 142. The prepaid server 142 stores information relating to prepaid subscribers, including subscribers' phone numbers, subscribers' credit card information, and subscribers' minimum account balances or threshold amounts. If the calling mobile station is a prepaid subscriber, the SMSC 140 queries the prepaid server 142 to determine if the calling subscriber has sufficient account balance before calling or forwarding the voice call or short message to the destination mobile station.

For the voice call, if the calling subscriber has insufficient account balance, current systems sends a notification to the subscriber via a band signal. However, the notification is sent only to the calling subscriber. Another problem associated with insufficient account balance of prepaid subscribers is missed, held, or undelivered short messages. Current systems fail to notify the subscribers with instructions on how to recover these messages.

One aspect of the present disclosure provides an improved method and system for handling insufficient account balance by withholding short messages and sending a notification short message to the subscriber regardless of whether a voice call or short messaging is in progress. In addition to the calling subscriber, notification may be sent to the called subscriber. For example, improved functionalities may be implemented within the SMSC, such as SMSC 140, to hold short messages and send notifications to calling and called subscribers. Once the account balance of the subscriber becomes sufficient, short messages withheld will be delivered.

Figure 2:
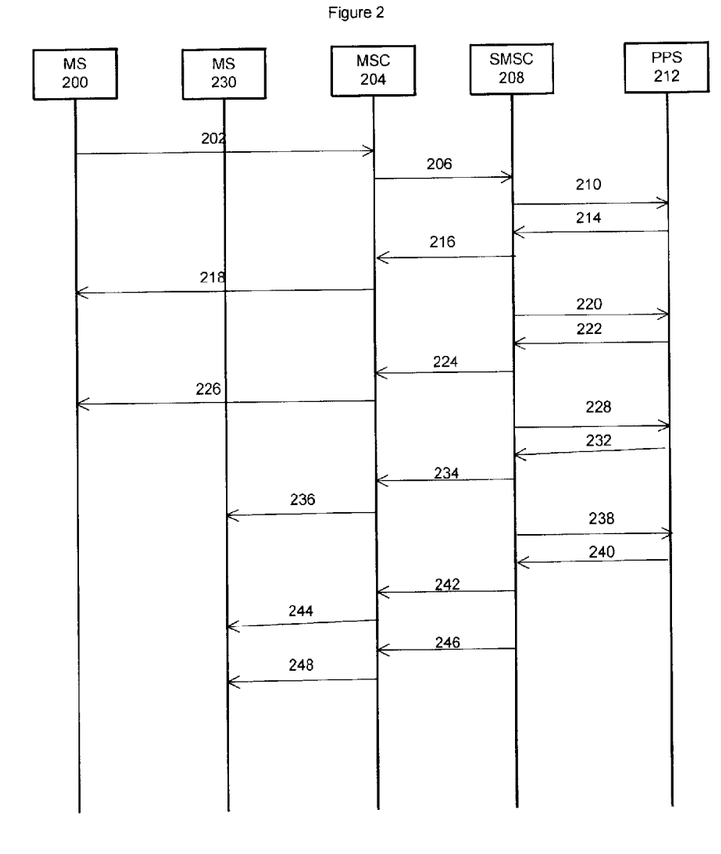
FIG. 2 depicts a sequence of short messages used for sending notification of insufficient account balance of prepaid or non-prepaid subscribers in accordance with an embodiment of the present disclosure.

Referring to FIG. 2, a sequence of short messages used for sending notification of insufficient account balance of prepaid or non-prepaid subscribers begins when mobile station 200 initiates a mobile-originating short message (MO-SM) 202 to the MSC 204. Upon receiving the short message, the MSC 204 forwards the short message 206 to SMSC 208 to be processed. Since mobile station 200 is a prepaid subscriber, the SMSC 208 sends a query 210 to prepaid server 212 to determine if the account balance of the subscriber is sufficient.

If prepaid server 212 determines that the account balance of the subscriber is insufficient, the prepaid server 212 returns an insufficient account balance message 214 to notify SMSC 208. The SMSC 208 then holds the short message sent by mobile station 200 and notifies mobile station 200 of the insufficient account balance by sending an acknowledgement or a new short message 216 to the MSC 204. The SMSC 208 may send notification message 216 periodically until the subscriber of mobile station 200 brings the account balance above the minimum threshold amount. In turn, the MSC 204 forwards the notification message 218 to mobile station 200. Notification message 218 may include instructions on how to replenish the account by depositing more funds.

In one embodiment, the SMSC 208 periodically sends a query message 220 to the prepaid server 212 for the account status of mobile station 200. The prepaid server 212 then returns the account status 222 to the SMSC 208. Alternative to a periodic request by SMSC 208, the prepaid server 212 may initiate a push of the account balance to the SMSC 208 if the account status of the subscriber has changed.

If the account balance remains insufficient, the SMSC 208 continues to withhold the short message sent by mobile station 200 and sends a notification short message 224 to the MSC 204 periodically. In turn, the MSC 204 forwards the periodic notification message 226 to mobile station 200. If the account balance of the subscriber is sufficient, the SMSC 208 sends a query message 228 to prepaid server 212 to determine if the account balance of the destination mobile station 230 is sufficient.

If prepaid server 212 determines that the account balance of the destination mobile station 230 is insufficient, the prepaid server 212 returns an insufficient account balance message 232 to notify SMSC 208. The SMSC 208 then holds the short message sent by mobile station 200 and notifies mobile station 230 of the insufficient account balance by sending an acknowledgement or a new short message 234 to the MSC 204. The SMSC 208 may send notification message 234 periodically until the subscriber of mobile station 230 brings the account balance above the minimum threshold amount. In turn, the MSC 204 forwards the notification message 236 to mobile station 230.

Notification message 236 may include instructions on how to replenish the account by depositing more funds. Such notification message may also contain a message to indicate that there is a short message and/or the number of short messages that has been on hold due to insufficient account balance. In addition, time, date, and other content of each short message on hold may also be provided. By providing indication of short messages on-hold, the subscriber may be more motivated to bring the account balance above the predetermined threshold, which may in turn provide increase revenue to the service provider.

In one embodiment, the SMSC 208 periodically sends a query message 238 to the prepaid server 212 for the account status of mobile station 230. The prepaid server 212 then returns the account status 240 to the SMSC 208. Alternative to a periodic request by SMSC 208, the prepaid server 212 may initiate a push of the account balance to the SMSC 208 if the account status of the subscriber has changed. It is noted that SMSC 208 may determine if the account balance is sufficient based on whether both the calling and called subscribers have sufficient account balances or whether either the calling or the called subscriber has a sufficient account balance.

If the account balance remains insufficient, the SMSC 208 continues to hold the short message and sends a notification short message 242 to the MSC 204 periodically. In turn, the MSC 204 forwards the periodic notification message 244 to mobile station 230. If the account balance is sufficient, the SMSC 208 forwards the short message 246 sent by mobile station 200 to MSC 204. In turn, the MSC 204 forwards short message 248 to mobile station 230. It is noted that if the short message is an emergency short message, such as a 9-1-1 short message, the SMSC still delivers the short message even though the account balance of mobile station 200 and/or mobile station 230 is insufficient. Since this is an incoming short message, the called subscriber may be either attached or detached to the network. If the subscriber is detached originally, this step may be accomplished only if the called subscriber is attached.

Thus, a notification short message may be sent to the calling or called subscribers for insufficient account balance. For calling subscribers, the notification short message may indicate that the account balance is insufficient or below a predetermined threshold amount. In addition, the notification short message may include instructions on how to bring the account balance above the predetermined threshold. Furthermore, the notification short message may indicate that outgoing short messages are withheld and will be delivered to the called subscriber once the account balance is above the predetermined threshold amount.

For called subscribers, the notification short message may indicate that the account balance is insufficient or below a predetermined threshold to receive incoming calls or short messages. In addition, the notification short message may include instructions on how to bring the account balance above the predetermined threshold. Furthermore, the notification short message may indicate that incoming voice call related information, such as calling party name, would be delivered once the account balance is above the predetermined threshold amount. Further, the notification message may also include the number of voice calls as well as time and date of voice calls made that cannot be terminated due to the insufficient account balance. The notification short message may also indicate that incoming short messages are withheld and will be delivered once the account balance is above the predetermined threshold. For example, the notification message may include the number of short messages that have been on hold, time, date and other content of short messages that were received but cannot be delivered due to the insufficient account balance. Moreover, the notification short message may indicate that the calling subscriber will be notified to call back once the account balance is above the predetermined threshold amount. The notification message may be sent via a short message or other types of messages, such as multi-media messages using a multi-media messaging service (MMS).

A periodic notification short message may be sent to either calling or called subscribers for insufficient account balance as well. The notification short message may indicate that the account balance is under a predetermined threshold amount, that no incoming voice calls or short messages will be received, and that no outgoing voice calls or short messages will be sent. In addition, the notification short message may indicate that once the account balance is above the predetermined threshold amount, any short message being withheld will be sent or delivered. Furthermore, the notification short message may indicate that incoming voice call related information, such as calling party name, would be delivered once the account balance is above the predetermined threshold amount. Moreover, the notification short message may include instructions on how to bring the account balance above the predetermined threshold.

Another problem associated with insufficient account balance of prepaid subscribers is missed calls. Typically, prepaid subscribers receive missed call notifications from the system via short messages. However, if the cause of missed calls is due to insufficient account balance, current systems fail to identify this problem and notify the subscribers with funding instructions. Another aspect of the present disclosure provides an improved method and system for handling insufficient account balance by sending a notification of missed calls to the subscriber using short messages and providing the subscriber with funding instructions and partial missed call information. For example, improved functionalities may be implemented within the SMSC, such as SMSC 140, to send missed call notifications and funding instructions to the subscriber. The SMSC may include both person call collector (PCC) and new functionalities provided by the present disclosure. In addition, the SMSC may be implemented as a virtual prepaid server from the point of view of the MSC.

Figure 3:
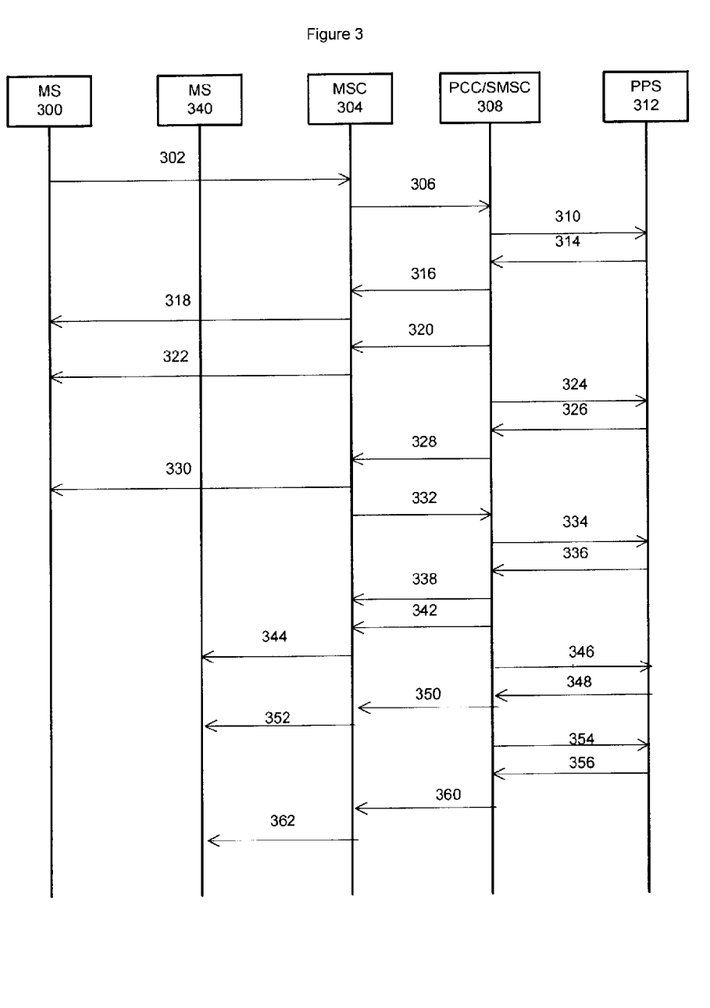
FIG. 3 depicts a sequence of short messages used for sending notifications of missed voice calls in accordance with an embodiment of the present disclosure.

Referring to FIG. 3, a sequence of short messages used for sending notification of missed voice calls begins when mobile station 300 initiates a voice call 302 to the MSC 304. Upon receiving the call, the MSC 304 sends a query message 306 to PCC/SMSC 308 to determine if the account balance of the subscriber is sufficient. From the point of view of the MSC 304, the PCC/SMSC 308 acts as a virtual prepaid server 312.

In turn, the PCC/SMSC 308 sends a real query 310 to real PPS 312 to determine if the account balance of the subscriber is sufficient.

If prepaid server 312 determines that the account balance of the subscriber is insufficient, the prepaid server 312 returns an insufficient account balance message 314 to notify PCC/SMSC 308. The PCC/SMSC 308 then notifies mobile station 300 of the insufficient account balance by sending an acknowledgement or a new short message 316 to the MSC 304. The MSC 304 disconnects the voice call and sends a normal tone or announcement 318 to mobile station 300.

In addition to the normal tone, the PCC/SMSC 308 also sends a notification of insufficient account balance 320 to the MSC 304. In turn, the MSC 304 forwards the notification message 322 to mobile station 300. In one embodiment, the PCC/SMSC 308 periodically sends a query message 324 to the prepaid server 312 for the account status of mobile station 300. The prepaid server 312 then returns the account status 326 to the PCC/SMSC 308. Alternative to a periodic request by SMSC 308, the prepaid server 312 may initiate a push of the account balance to the PCC/SMSC 308 if the account status of the subscriber has changed.

If the account balance remains insufficient, the PCC/SMSC 308 continues to send a notification short message 328 to the MSC 304 periodically. In turn, the MSC 304 forwards the periodic notification message 330 to mobile station 300. If the account balance is sufficient and mobile station 300 initiates a new voice call to MSC 304, the MSC 304 sends a query message 332 to PCC/SMSC 308 to determine if the account balance of the destination mobile station 340 is sufficient. In turn, the PCC/SMSC 308 sends a real query 334 to real prepaid server 312 to determine the account status of destination mobile station 340.

If prepaid server 312 determines that the account balance of the destination mobile station 340 is insufficient, the prepaid server 312 returns an insufficient account balance message 336 to notify PCC/SMSC 308. The PCC/SMSC 308 then notifies mobile station 340 of the insufficient account balance by sending an acknowledgement or a new short message 338 to the MSC 304. The MSC 304 disconnects the voice call. The PCC/SMSC 308 also sends an insufficient account balance message 342 to MSC 304 to notify mobile station 340. The MSC 304 forwards notification message 344 to mobile station 340.

In one embodiment, the PCC/SMSC 308 periodically sends a query message 346 to the prepaid server 312 for the account status of mobile station 340. The prepaid server 312 then returns the account status 348 to the PCC/SMSC 308. Alternative to a periodic request by PCC/SMSC 308, the prepaid server 312 may initiate a push of the account balance to the PCC/SMSC 308 if the account status of the subscriber has changed.

If the account balance remains insufficient, the PCC/SMSC 308 continues to send an insufficient account balance notification message 350 to the MSC 304. In turn, the MSC 304 forwards the notification message 352 to mobile station 340. The PCC/SMSC 308 again sends a query message 354 to prepaid server 312 to determine if the account balance of the destination mobile station 340 is sufficient. The prepaid server 312 returns the account status 356 to the PCC/SMSC 308. If the account balance is sufficient, the PCC/SMSC 308 sends a missed call notification message 360 to the MSC 304. The MSC 304 then forwards the missed call notification message 362 to mobile station 340.

In addition to sending a notification of insufficient account balance message to the subscriber, another aspect of the present disclosure routes the voice call to a voice mail system and notifies the called subscriber that the account balance is insufficient and access to recorded voice mails will be denied unless the account balance is above a predetermined threshold amount.

Figure 4A:
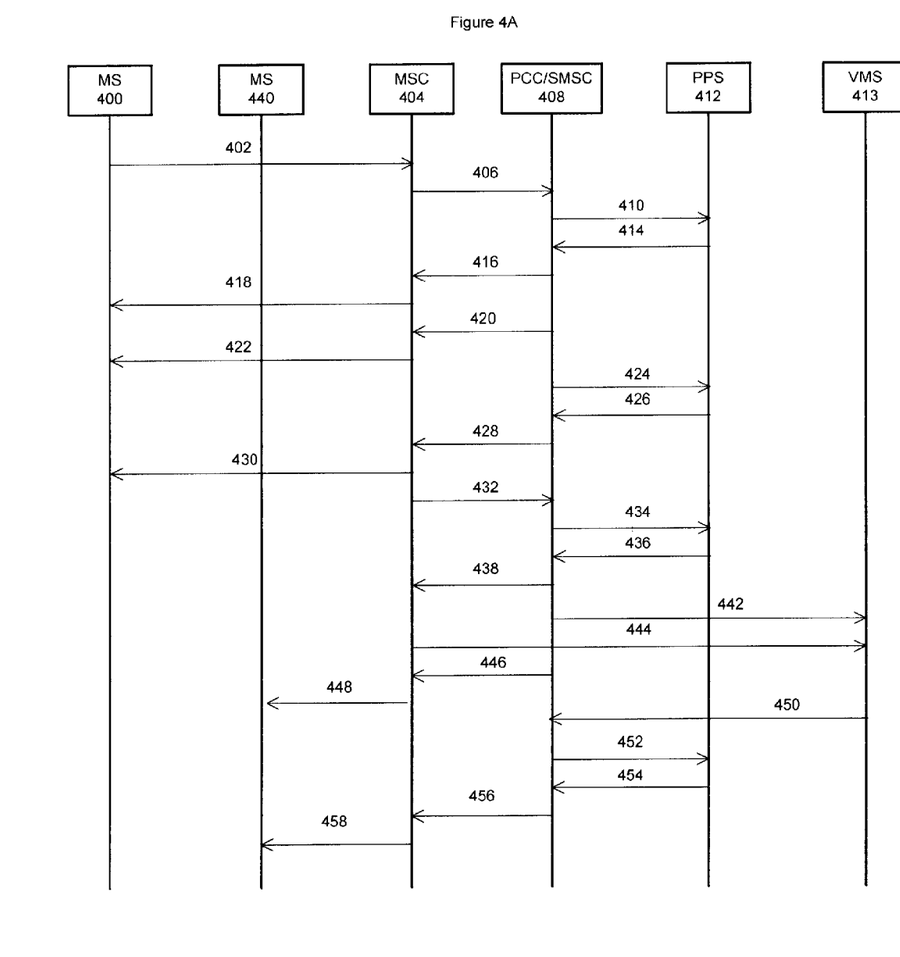
FIG. 4A depicts a sequence of short messages used for routing voice calls to voice mail system and sending notifications of voice mails in accordance with an embodiment of the present disclosure.

Referring to FIG. 4A, a sequence of short messages used for routing missed voice call to voice mail and sending notification of voice mails begins when mobile station 400 initiates a voice call 402 to the MSC 404. Upon receiving the call, the MSC 404 sends a query message 406 to PCC/SMSC 408 to determine if the account balance of the subscriber is sufficient. From the point of view of the MSC 404, the PCC/SMSC 408 acts as a virtual prepaid server 412. In turn, the PCC/SMSC 408 sends a real query 410 to real PPS 412 to determine if the account balance of the subscriber is sufficient.

If prepaid server 412 determines that the account balance of the subscriber is insufficient, the prepaid server 412 returns an insufficient account balance message 414 to notify PCC/SMSC 408. The PCC/SMSC 408 then notifies mobile station 400 of the insufficient account balance by sending an acknowledgement or a new short message 416 to the MSC 404. The MSC 404 disconnects the voice call and sends a normal tone or announcement 418 to mobile station 400.

In addition to the normal tone, the PCC/SMSC 408 also sends a notification of insufficient account balance 420 to the MSC 404. In turn, the MSC 404 forwards the notification message 422 to mobile station 400. In one embodiment, the PCC/SMSC 408 periodically sends a query message 424 to the prepaid server 412 for the account status of mobile station 400. The prepaid server 412 then returns the account status 426 to the PCC/SMSC 408. Alternative to a periodic request by SMSC 408, the prepaid server 412 may initiate a push of the account balance to the PCC/SMSC 408 if the account status of the subscriber has changed.

If the account balance remains insufficient, the PCC/SMSC 408 continues to send a notification short message 428 to the MSC 404 periodically. In turn, the MSC 404 forwards the periodic notification message 430 to mobile station 400. If the account balance is sufficient and mobile station 400 initiates a new voice call to MSC 404, the MSC 404 sends a query message 432 to PCC/SMSC 408 to determine if the account balance of the destination mobile station 440 is sufficient. In turn, the PCC/SMSC 408 sends a real query 434 to real prepaid server 412 to determine the account status of destination mobile station 440.

If prepaid server 412 determines that the account balance of the destination mobile station 440 is insufficient, the prepaid server 412 returns an insufficient account balance message 436 to notify PCC/SMSC 408. The PCC/SMSC 408 then notifies mobile station 440 of the insufficient account balance by sending an acknowledgement or a new short message 438 to the MSC 404.

Alternative to disconnecting the call, the PCC/SMSC 408 may send a message to MSC 404 to instruct MSC 404 to route the voice call 442 to a voice mail system (VMS) 413. For example, in a IS-41 network, the voice mail number of mobile station 440 may be inserted in the ANALYZED INFORMATION RETURN RESULT message. Alternatively, the MSC 404 may route the voice call 444 to voice mail system (VMS) 413 on its own upon receiving the message. The voice mail system (VMS) 413 provides the calling party, such as mobile station 400, an announcement to leave a voice mail to the called party. The PCC/SMSC 408 also sends a missed call notification message 446 to MSC 404 to notify mobile station 440. The missed call notification message 446 may indicate the number of voice mails recorded in the voice mail system (VMS) 413 and that the called subscriber must bring the account balance above the predetermined threshold amount before voice mails can be retrieved from the voice mail system (VMS) 413. In addition, the missed call notification message 446 may provide a comparison between the number of voice mails recorded due to insufficient account balance and the number of voice mails that are recorded due to unavailability of the subscriber, for example, busy signal or power off, and not insufficient account balance. The routing of voice calls to voice mail system (VMS) 413 may provide increased revenue to the service provider. Upon receiving the missed call notification message 446, the MSC 404 forwards the message 448 to mobile station 440. Since this is an incoming voice call, the called subscriber may be either attached or detached to the network. If the subscriber is detached originally, this step may be accomplished only if the called subscriber is attached.

Unlike the insufficient account balance notification message, the missed call notification message 448 may include detail information related to the missed call(s), for example, the calling party number(s) and time and/or date of the missed calls, etc. In this way, the called subscriber may contact the calling parties directly once the account balance is back above the predetermined threshold. In the case where PCC/SMSC 408 or MSC 404 had forwarded the missed voice call(s) to voice mail system (VMS) 413, such missed call notification message 448 may also indicate the number of voice mails recorded in VMS 413, the calling party numbers, and time and/or of date of voice mails. In this way, called subscribers may retrieve the saved voice mails directly.

If a voice mail is recorded, the voice mail system 413 sends a voice mail notification message 450 to PCC/SMSC 408 to indicate that a voice mail is on hold. The PCC/SMSC 408 then sends a query 452 to prepaid server 412 to determine if the account balance of mobile station 440 is sufficient. If the account balance is insufficient, the prepaid server 412 returns an insufficient account balance message 454 to PCC/SMSC 408. The PCC/SMSC 408 prepares a voice mail hold and sends the insufficient account balance message 456 to MSC 404. In turn, the MSC 408 forwards message 458 to mobile station 440. Since this is an incoming voice call, the called subscriber may be either attached or detached to the network. If the subscriber is detached originally, this step may be accomplished only if the called subscriber is attached.

Figure 4B:
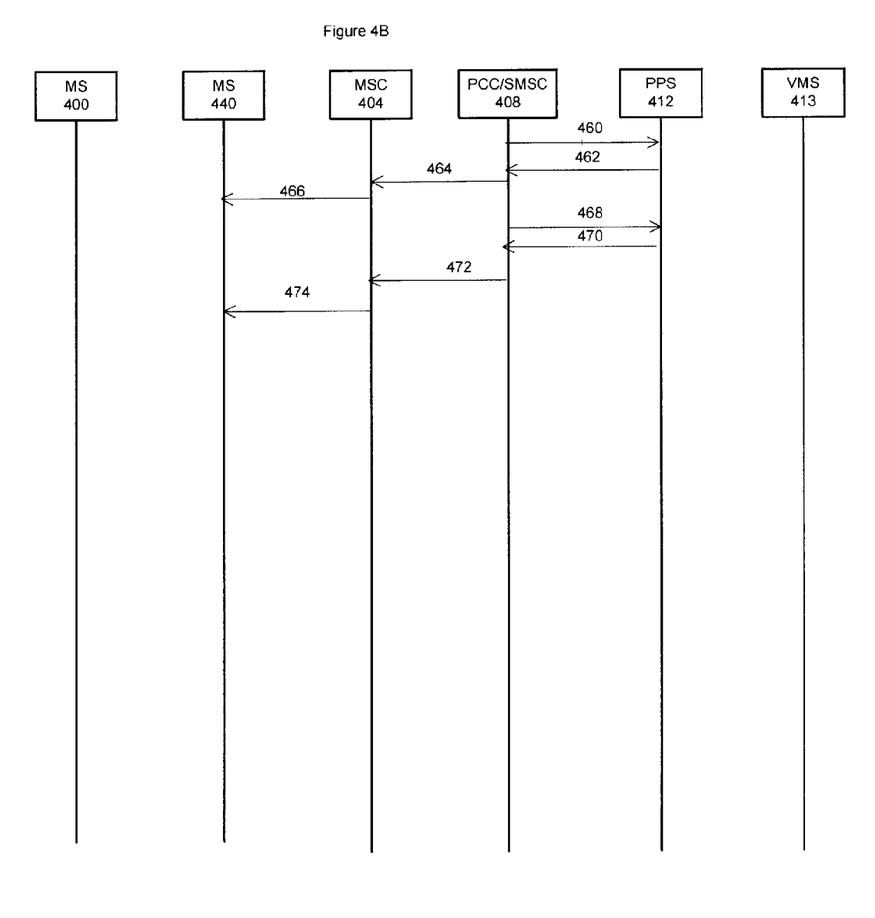
FIG. 4B depicts a continuing sequence of short messages used for routing voice calls to voice mail system and sending notifications of voice mails in accordance with an embodiment of the present disclosure.

Referring to FIG. 4B, a sequence of short messages used for routing missed voice call to voice mail and sending notification of voice mails continues when the PCC/SMSC 408 periodically sends a query message 460 to the prepaid server 412 for the account status of mobile station 440. The prepaid server 412 then returns the account status 462 to the PCC/SMSC 408. Alternative to a periodic request by PCC/SMSC 408, the prepaid server 412 may initiate a push of the account balance to the PCC/SMSC 408 if the account status of the subscriber has changed.

If the account balance remains insufficient, the PCC/SMSC 408 prepares a voice mail hold and sends an insufficient account balance notification message 464 to the MSC 404. In turn, the MSC 404 forwards the notification message 466 to mobile station 440. The PCC/SMSC 408 again sends a query message 468 to prepaid server 412 to determine if the account balance of the destination mobile station 440 is sufficient. The prepaid server 412 returns the account status 470 to the PCC/SMSC 408. If the account balance is sufficient, the PCC/SMSC 408 sends a voice mail notification message 472 to the MSC 404. The MSC 404 then forwards the voice mail notification message 474 to mobile station 440. Since this is an incoming voice call, the called subscriber may be either attached or detached to the network. If the subscriber is detached originally, this step may be accomplished only if the called subscriber is attached.

Instead of serving as a virtual prepaid server, the SMSC may operate in a monitoring mode for monitoring signaling links between the MSC and the prepaid server. In this mode, only prepaid charge related messages are captured. For example, prepaid related messages such as InitialDP message in a GSM network and ANALYZED INFORMATION message in a IS-41 network may be captured by the SMSC.

Figure 5:
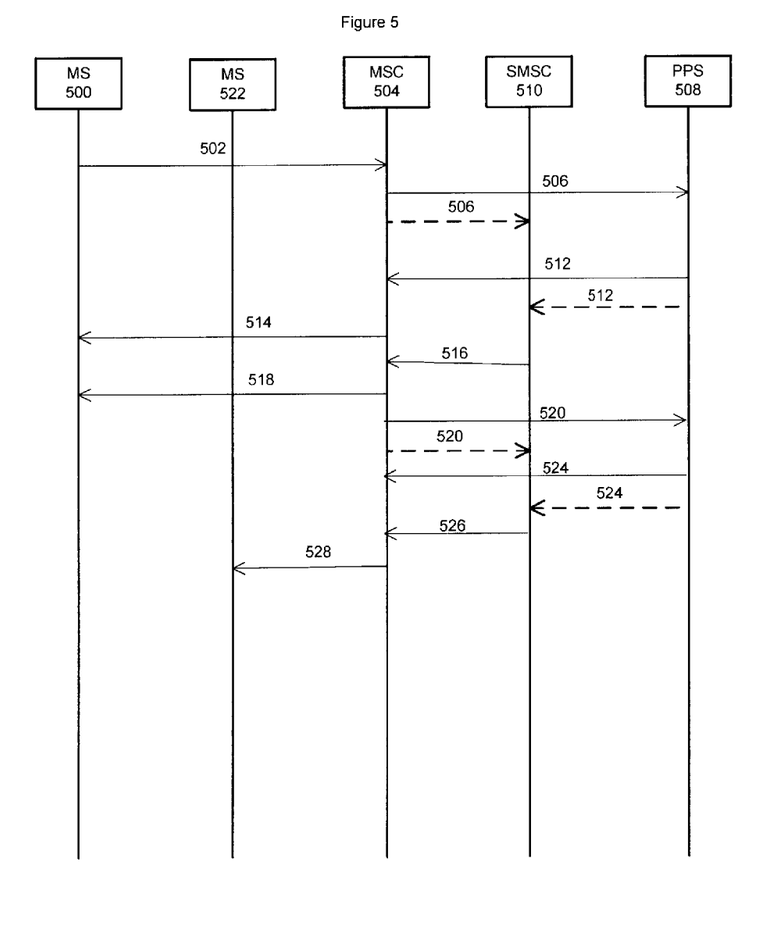
FIG. 5 depicts an alternative sequence of short messages used for sending notification of missed voice calls in accordance with an embodiment of the present disclosure.

Referring to FIG. 5, an alternative sequence of short messages used for sending notification of missed voice calls begins when mobile station 500 initiates a voice call 502 to the MSC 504. Upon receiving the call, the MSC 504 sends a query message 506 to prepaid server 508 to determine if the account balance of the subscriber is sufficient. The SMSC 510 monitors the data links between the MSC 504 and the prepaid server 508 and captures the query message 506.

If prepaid server 508 determines that the account balance of the subscriber is insufficient, the prepaid server 508 returns an insufficient account balance message 512 to notify MSC 504. The SMSC 510 monitors the data links between the MSC 504 and the prepaid server 508 and captures the insufficient account balance message 512. The MSC 504 disconnects the voice call and sends a normal tone or announcement 514 to mobile station 500.

The SMSC 510 also sends a notification of insufficient account balance 516 to the MSC 504. In turn, the MSC 504 forwards the notification message 518 to mobile station 500. If the account balance is sufficient and mobile station 500 initiates a new voice call to MSC 504, the MSC 504 sends a query message 520 to prepaid server 508 to determine if the account balance of the destination mobile station 522 is sufficient. The SMSC 510 monitors the data links between the MSC 504 and the prepaid server 508 and captures the query message 520.

If prepaid server 508 determines that the account balance of the destination mobile station 522 is insufficient, the prepaid server 508 returns an insufficient account balance message 524 to notify MSC 504. The SMSC 510 monitors the data links between the MSC 504 and the prepaid server 508 and captures the insufficient account balance message 524. The MSC 504 disconnects the voice call as a result. The SMSC 508 then sends an insufficient account balance message 526 to MSC 504 to notify mobile station 522. The MSC 504 forwards notification message 528 to mobile station 522. Since this is an incoming short message, the called subscriber may be either attached or detached to the network. If the subscriber is detached originally, this step may be accomplished only if the called subscriber is attached.

If the cause of missed calls is due to insufficient account balance, notification short messages may be sent to either the calling or called subscribers. In addition, the notification short message may include funding instructions along with partial missed call information to the called subscriber. For example, the missed call information may include useful information, such as the number of missed calls, but not the calling party's name or phone number. The complete missed call information may be delivered once the account balance is above the predetermined threshold amount. Furthermore, even if the account balance is insufficient for voice calls, incoming notification short messages may still be delivered to the called subscriber.

Systems, methods, and computer readable media have been shown and/or described in the above embodiments for handling insufficient account balance of prepaid subscribers. Although the above descriptions set forth preferred embodiments, it will be understood that there is no intent to limit the invention by such disclosure, but rather, it is intended to cover all modifications and alternate implementations falling within the spirit and scope of the invention. Furthermore, the embodiments are intended to cover capabilities and concepts whether they be via a loosely coupled set of components or they be converged into one or more integrated components, devices, circuits, and/or software programs.

For example, aspects of the present disclosure are applicable to both calling and called subscribers if the account balance of either one of them falls below a predetermined threshold amount. In addition, aspects of the present disclosure are applicable to both when the account balance is insufficient and when the account balance is below a threshold. Aspects of the present disclosure are also applicable to both voice calls and non-voice calls. The calls may be made intra-country or inter-country. The calls may also be provided inter-carrier or intra-carrier and either inter-network or intra-network. The mobile communications network may be inter-technology, such as a GSM network, or intra-technology, such as a code division multiple access network. The calls and short messages sent may be intra-MSC or inter-MSC and the mobile stations may be homers or roamers. In addition to short message and voice mails, other types of messages may be sent without departing the spirit and scope of the present disclosure. For example, multi-media messages may be sent via a multi-media messaging service (MMS) to notify the subscriber of insufficient account balance and instructions to bring the account balance above the predetermined threshold amount before such messages may be delivered, received, or retrieved by the subscriber.

What is claimed is:

1. A method for handling insufficient account balance of subscribers, comprising:
   receiving a request for communication from a mobile station;
   determining whether a subscriber of the mobile station has an insufficient account balance; and
   withholding the request for communication and notifying the subscriber when the subscriber has an insufficient account balance regardless of whether a voice call or a short messaging service via the mobile station is in progress, wherein
   the notification comprises instructions to the subscriber regarding how to recover the withheld communication.

2. The method of claim 1, wherein determining if a subscriber of the mobile station has an insufficient account balance comprises:
   sending a query for an account balance of a subscriber to a prepaid server;
   receiving the account balance from the prepaid server; and
   determining if the account balance is below a predetermined threshold amount.

3. The method of claim 2, wherein the query is sent to the prepaid server periodically.

4. The method of claim 2, wherein the notifying comprises notifying the mobile station automatically if the account balance is above the predetermined threshold amount.

5. The method of claim 1, wherein notifying the mobile station comprises:
   sending a short message indicating an insufficient account balance to the mobile station and wherein the short message comprises time and date of the request.

6. The method of claim 5, wherein the short message is sent to the mobile station periodically.

7. The method of claim 3, wherein the short message comprises instructions on how to replenish funds.

8. The method of claim 1, further comprising:
   determining if a subscriber of a destination mobile station has an insufficient account balance; and
   withholding the request and notifying the destination mobile station if the subscriber has an insufficient account balance.

9. The method of claim 8, further comprising:
   forwarding the request to the destination mobile station if the subscriber has a sufficient account balance.

10. A method for handling insufficient account balance of subscribers, comprising:
    receiving a voice call from a mobile station;
    determining whether a subscriber of the mobile station has an insufficient account balance; and
    withholding the voice call and notifying the subscriber when the subscriber has an insufficient account balance regardless of whether a voice call or a short messaging service via the mobile station is in progress, wherein
    the notification comprises instructions to the subscriber regarding how to recover the withheld voice call.

11. The method of claim 10, wherein notifying the mobile station comprises:
    sending a short message indicating an insufficient account balance periodically to the mobile station until the account balance is above a predetermined threshold amount.

12. The method of claim 10, wherein withholding the voice call and notifying the mobile station if the subscriber has an insufficient account balance comprises:
    determining if a subscriber of a destination mobile station has an insufficient account balance;
    routing the voice call to a voice mail system and notifying the destination mobile station if the subscriber of the destination mobile station has an insufficient account balance.

13. The method of claim 12, wherein notifying the destination mobile station comprises:
    sending a missed call notification short message to the destination mobile station if the subscriber has an insufficient account balance.

14. The method of claim 13, wherein the missed call notification short message comprises time and date of the voice call.

15. The method of claim 12, wherein notifying the destination mobile station comprises:
    sending a voice mail notification message to the destination mobile station if a voice mail is recorded in the voice mail system, the voice call notification message indicating a recorded voice mail for the destination mobile station.

16. A non-transitory computer readable medium comprising instructions for:
    monitoring requests for voice calls between a mobile station and a prepaid server;
    determining whether a subscriber of the mobile station has an insufficient account balance responsive to receiving a request for a voice call or short messaging service from the mobile station regardless of whether a voice call or a short messaging service via the mobile station is in progress; and
    disconnecting the voice call or withholding the short messaging service and notifying the subscriber when the subscriber has an insufficient account balance, wherein the notification comprises instructions to the subscriber regarding how to recover the withheld voice call.

17. The non-transitory computer readable medium of claim 16, comprising instructions for sending a short message indicating an insufficient account balance to the mobile station.

18. The non-transitory computer readable medium of claim 17, comprising instructions for:
   determining if a subscriber of a destination mobile station has an insufficient account balance responsive to receiving a request for a voice call from the mobile station; and
   disconnecting the voice call and notifying the destination mobile station if the subscriber has an insufficient account balance.

19. A system for handling insufficient account balance of subscribers, comprising:
   at least one mobile station;
   at least one mobile switching center communicably connected to the at least one mobile station and at least one short message service center;
   at least one short message service center communicably connected to at least one mobile switching center; and
   a prepaid server communicably connected to the at least one short message service center,
   wherein the at least one short message service center is configured to receive a request for communication from the at least one mobile station, determine whether a subscriber of the at least one mobile station has an insufficient account balance, and withhold the request and notify the subscriber when the subscriber has an insufficient account balance regardless of whether a voice call or a short messaging service via the mobile station is in progress, wherein
   the notification comprises instructions to the subscriber regarding how to recover the withheld communication.

20. The system of claim 19, further comprising:
   at least one voice mail system for recording voice mail, wherein the at least one short message service center is further operable to determine if a subscriber of a destination mobile station has an insufficient account balance responsive to receiving a voice call from the at least one mobile station, and route the voice call to a voice mail system and notifying the destination mobile station if the subscriber of the destination mobile station has an insufficient account balance.

* * * * *